US008544586B2

(12) United States Patent
Al-Osaimi

(10) Patent No.: US 8,544,586 B2
(45) Date of Patent: Oct. 1, 2013

(54) MULTIFUNCTION UTILITY CART

(76) Inventor: Zafer J. S. Al-Osaimi, Sabah Al-Salem (KW)

( * ) Notice: Subject to any disclaimer, the term of this patent is extended or adjusted under 35 U.S.C. 154(b) by 0 days.

(21) Appl. No.: 13/584,267

(22) Filed: Aug. 13, 2012

(65) Prior Publication Data

US 2013/0119640 A1 May 16, 2013

Related U.S. Application Data

(63) Continuation of application No. 13/298,103, filed on Nov. 16, 2011.

(51) Int. Cl.
*B62D 21/14* (2006.01)

(52) U.S. Cl.
USPC ........ 180/209; 180/89.13; 280/783; 280/778; 296/19

(58) Field of Classification Search
USPC ................ 280/638, 35, 640, 43.16, 783, 778; 180/208, 209, 291, 65.1, 89.13, 89.17, 908; 296/19, 20, 26.09, 190.04, 10, 22, 18, 169, 296/174, 24.38, 24.45, 67; 297/43, 60
See application file for complete search history.

(56) References Cited

U.S. PATENT DOCUMENTS 1,263,918 A * 4/1918 Miller .............................. 296/19
1,484,522 A * 2/1924 Moore ............................ 296/174
3,179,198 A * 4/1965 Hastings, Jr. ................ 180/65.1
3,400,968 A * 9/1968 Smith ............................ 296/174
4,287,966 A * 9/1981 Frees ............................. 187/231
4,415,051 A * 11/1983 Taylor ........................... 180/65.1
4,809,804 A * 3/1989 Houston et al. ............ 180/65.51
D305,745 S * 1/1990 Hayata ............................ D12/85
4,919,225 A * 4/1990 Sturges .......................... 180/210
5,012,880 A * 5/1991 Abner ........................... 180/89.11
5,366,036 A * 11/1994 Perry ............................ 180/65.1
5,421,131 A * 6/1995 Heckman et al. ............... 52/263
5,702,142 A * 12/1997 Newell ............................ 296/19
6,397,961 B1 * 6/2002 Sutton ........................... 180/65.1
6,446,742 B1 * 9/2002 Wilson ........................... 180/65.6
6,659,211 B2 * 12/2003 Esposito ....................... 180/65.1
7,028,351 B1 * 4/2006 Frieder et al. ..................... 5/118
7,086,491 B2 * 8/2006 Matte ............................. 180/65.1
7,165,702 B1 * 1/2007 Billberg ......................... 224/401
7,174,976 B2 * 2/2007 Kamen et al. ................. 180/19.1

(Continued)

OTHER PUBLICATIONS

Prior art cited in parent U.S. Appl. No. 13/298,103, filed Nov. 16, 2011, the priority of which is claimed herein.

*Primary Examiner* — Katy M Ebner
*Assistant Examiner* — Emma K Frick
(74) *Attorney, Agent, or Firm* — Richard C. Litman

(57) ABSTRACT

The multifunction utility cart is a compact versatile self-propelled vehicle adapted particularly for use by security and/or emergency medical personnel. The cart includes an extendable wheelbase and rear body portion for the carriage of additional personnel and/or one or more injured persons on board, yet forms a very compact vehicle when the wheelbase and bodywork are retracted. A stretcher may be deployed from one side of the cart when extended, the extended rear-ward portion providing for the carriage of additional personnel or a wheelchair due to a drop-down floor at the rear of the cart. Additional storage space is provided in a forward trunk and one rear fender opposite the stretcher storage area for the carriage of a fire extinguisher, medical supplies, and/or other equipment. The standing operator station may be selectively elevated to provide the operator with a better view in crowded environments.

6 Claims, 7 Drawing Sheets

(56) References Cited

U.S. PATENT DOCUMENTS

| | | | | |
|---|---|---|---|---|
| 7,188,880 | B1 * | 3/2007 | Frieder et al. | 296/20 |
| 7,191,854 | B2 * | 3/2007 | Lenkman | 180/65.1 |
| 7,328,926 | B1 * | 2/2008 | Myers et al. | 296/19 |
| 7,395,625 | B2 * | 7/2008 | Chladny | 40/591 |
| 7,445,416 | B2 * | 11/2008 | O'Leary et al. | 414/546 |
| 7,883,133 | B2 * | 2/2011 | Chinn | 296/19 |
| 8,104,814 | B2 * | 1/2012 | Sartin et al. | 296/24.38 |
| 8,226,144 | B2 * | 7/2012 | Sheikhha et al. | 296/26.08 |
| 2004/0262871 | A1 * | 12/2004 | Schreuder et al. | 280/87.1 |
| 2008/0196951 | A1 * | 8/2008 | Gal et al. | 180/65.1 |
| 2010/0084831 | A1 * | 4/2010 | Wang | 280/39 |
| 2012/0032465 | A1 * | 2/2012 | Morita et al. | 296/26.09 |

* cited by examiner

MULTIFUNCTION UTILITY CART

CROSS-REFERENCE TO RELATED APPLICATIONS

This is a continuation of my prior application Ser. No. 13/298,103, filed Nov. 16, 2011 now pending.

BACKGROUND OF THE INVENTION

1. Field of the Invention

The present invention relates generally to motorized vehicles, and particularly to a multifunction utility cart adapted particularly for security and medical emergency operations, although the cart is also adaptable to other uses.

2. Description of the Related Art

The development of the self-propelled vehicle has led to innumerable variations on the theme. When smaller and lighter gasoline and electric motors became available, various small and relatively lightweight utility vehicles were developed. Among these vehicles are golf carts, small motorized utility carts and pallet carts for use in factories and warehouses, single seat carts for handicapped individuals in large stores and shopping malls, etc. Many of these vehicles are electrically powered, where indoor use or travel over limited distances (e.g., in a shopping mall or on a golf course) is the norm.

Some of these vehicles have been adapted by security and medical personnel for use in the short distance transport of personnel to and from an accident scene, or perhaps crowd control or other situations where security may be needed. However, such conventional vehicles are not well adapted for these functions. Smaller vehicles generally do not have the capacity to carry injured persons, particularly in the event of a relatively serious injury where stretcher transport is required. However, larger vehicles that provide for such carriage are generally restricted in their travel in tightly congested or confined areas due to their size.

Thus, a multifunction utility cart solving the aforementioned problems is desired.

SUMMARY OF THE INVENTION

The multifunction utility cart is a small, self-propelled vehicle having a single operator station. The cart includes four wheels, with at least two of the wheels being driven. Electric power is the preferred means of powering the cart, but the cart is adaptable to other power systems as well. The cart in its most compact configuration is capable of maneuvering into relatively tight confines, as its retracted length is preferably somewhat less than ten feet (three meters), the width being even less. However, the cart can provide for the carriage of persons in addition to the operator, having an extendable wheelbase and body structure. When extended, the cart can deploy a full-length stretcher from one side thereof, enabling the cart to carry a supine person on the stretcher. In addition, a rearwardly disposed floor is deployed when the cart is in its extended length configuration, the rear floor capable of being lowered to the underlying surface to enable a wheelchair or the like to be loaded onto the rear floor for carriage.

Numerous additional features are provided as well. The operator of the cart is in a standing position while operating the vehicle, control being provided by controls disposed in left and right side armrests to each side of the operator. The operator may selectively elevate the operator platform to raise the line of sight of the operator well above any surrounding crowds to gain a better view of the immediate surroundings. A fold-out chair or seat is provided at the front of the rear platform for the carriage of additional medical, security, or other personnel when needed. The front and right rear of the cart include storage compartments for the carriage of additional articles, e.g., a fire extinguisher, medical supplies, etc. Accordingly, the multifunction utility cart is particularly useful for security and emergency medical operations in such venues as shopping malls, parking lots, major athletic events, theme parks, and similar areas with relatively high population densities.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The multifunction utility cart is a very versatile vehicle with a large number of different functions and features that provide excellent utility for medical and other emergency personnel in various public gatherings. The cart is particularly useful at events where large numbers of the public are gathered, e.g., sporting events, shopping areas, fairs and other public gatherings, etc., where minor accidents and/or injuries and crowd control may have to be addressed from time to time. The cart is self-propelled, e.g., by one or more conventional electric motors and appropriate power supply such as electrical storage batteries installed in the lower floor of the cart, although other power systems may be used alternatively.

Figure 1:
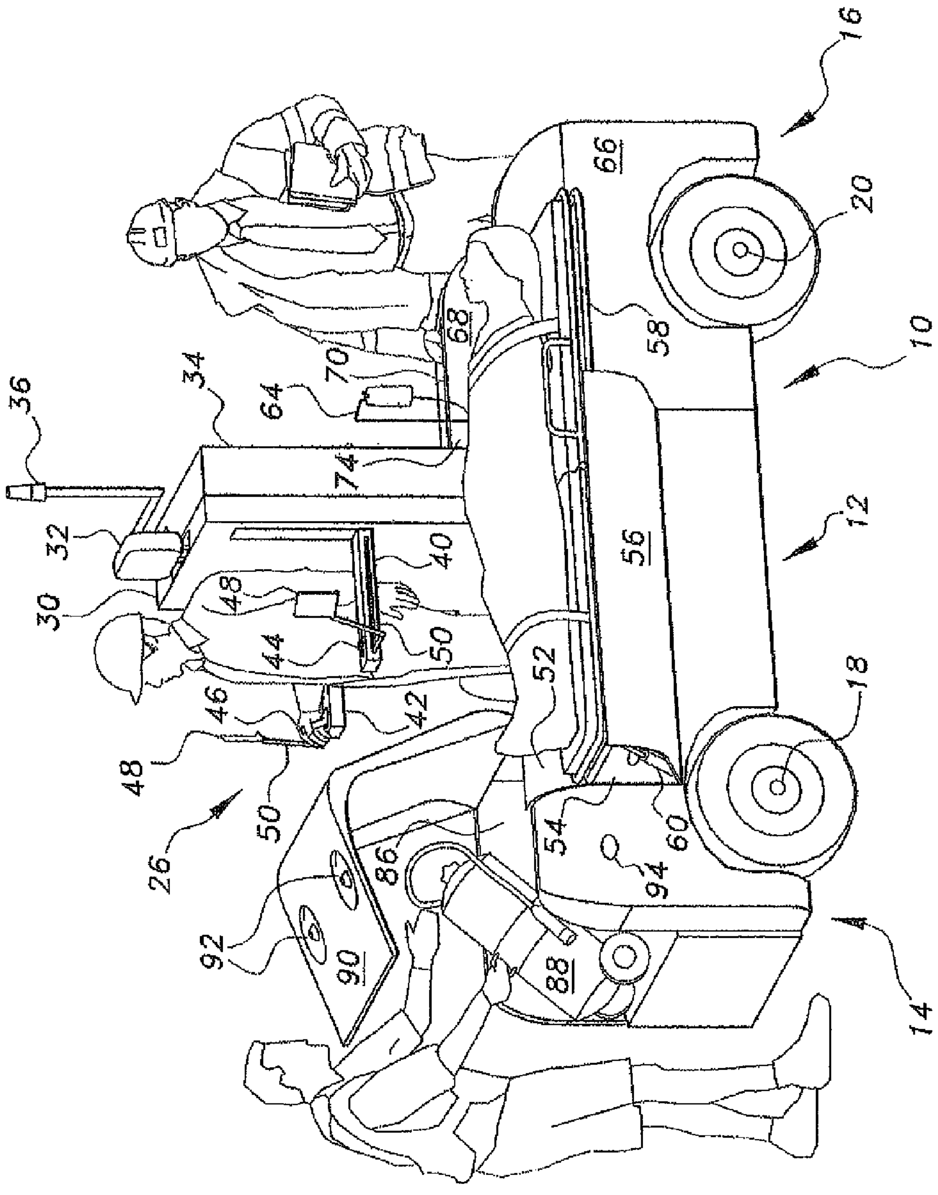
FIG. 1 is an environmental, perspective view of a multifunction utility cart according to the present invention, illustrating many of its features.

FIG. 1 of the drawings provides a left front perspective view of the multifunction utility cart or cart 10, illustrating many of its various features. The cart 10 is adjustable in length for compact storage when not in use and for greater maneuverability, but may be extended for the carriage of additional personnel and/or equipment as needed, FIG. 4 of the drawings illustrates the extended rear bodywork in broken lines, with the retracted length of the cart 10 being shown in solid lines. The cart 10 has a body 12 having a forward portion 14 and a rearward portion 16, with the forward portion 14 having a forward axle 18 and the rearward portion 16 having a rearward axle 20. Each axle 18 and 20 may comprise separate, independent left and right wheel axles, and need not be directly laterally interconnected except by the bodywork or vehicle structure therebetween.

Figure 6:
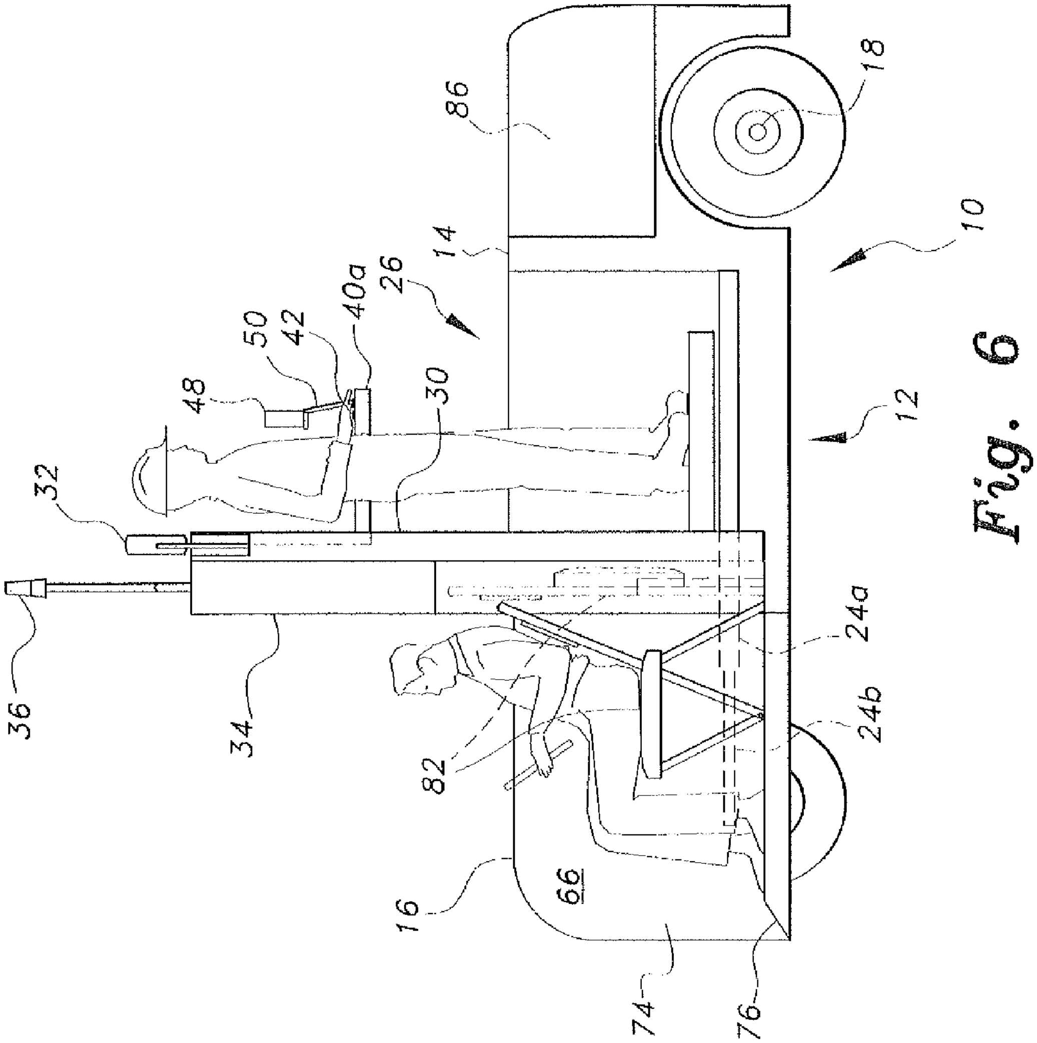
FIG. 6 is a diagrammatic right side elevation view of the multifunction utility cart according to the present invention, illustrating further features and details thereof.

The rearward portion 16 of the body 12 can be telescoped relative to the forward portion 14, to be selectively extended and retracted as required for the specific mission or operation at hand. As the forward axle 18 is affixed to the forward portion 14 of the body 12 and the rearward axle 20 is affixed to the rearward portion 16 of the body 12, it will be seen that the wheelbase defined by the two axles 18 and 20 will lengthen and shorten as the rear body portion 16 extends and retracts from the forward body portion 14, as shown most clearly in FIG. 4 by the shortened wheelbase 22*a* and the lengthened wheelbase 22*b*. FIG. 6 of the drawings illustrates the internal longitudinal frame members 24*a* and 24*b* that telescope relative to one another to provide for the extension and retraction of the rear body portion 16 from and into the forward body portion 14. The extension and retraction may be driven by a conventional electric motor(s) and mechanical system such as a screw jack, etc., using the same battery power as used to propel the cart 10.

The cart 10 includes a generally medially positioned open operator station 26 therein. The configuration of the operator station 26 of the cart 10 facilitates the compact configuration of the cart. The open operator station 26 requires that the operator remain standing while operating the cart 10, thus reducing the longitudinal space or area that would be required for a seated operator. Moreover, the eye level of the standing operator is somewhat higher than would be the case if the operator were seated, thus providing some additional advantage in viewing the scene. The operator station 26 includes one open side, e.g., the right side of the cart 10, to permit the operator to enter and exit the operator station 26. The opposite side of the operator station is defined by structure providing for the carriage of a stretcher or the like, as shown in the drawings and described in detail further below.

The operator station 26 includes an operator platform 28 upon which the operator stands during operation of the cart 10, with an operator support 30 extending upward from the platform 28. A retractable headrest 32 may be provided at the upper portion of the support 30 for additional support for the operator, with the headrest 32 shown retracted in FIGS. 4 and 5. (The headrest is not shown in FIG. 7, in order to illustrate other features of the support 30.) The operator stands atop the platform 28 with his or her back toward the support 30 during operation of the cart 10, generally as shown in FIGS. 1 and 6 of the drawings.

Figure 4:
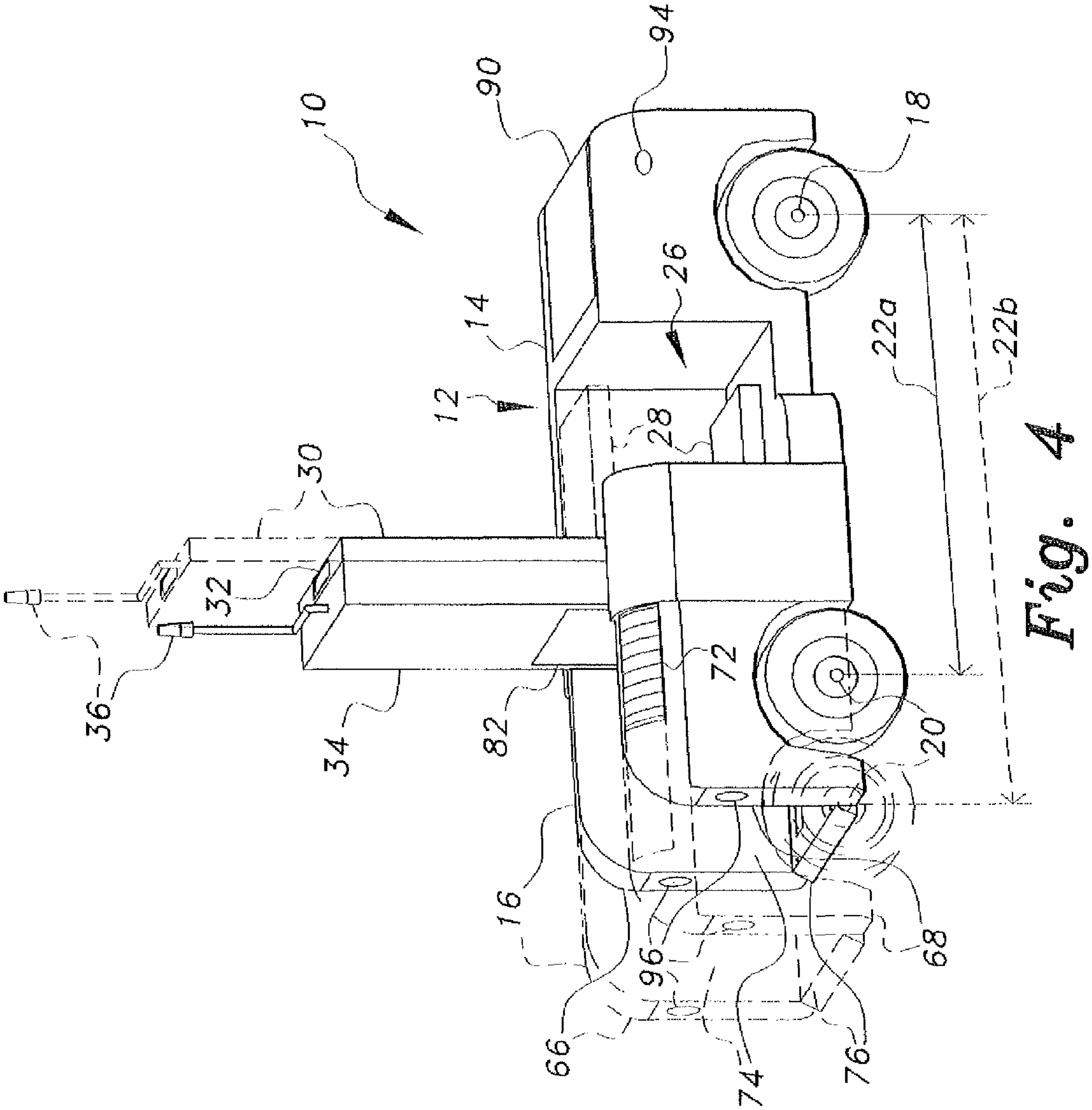
FIG. 4 is a perspective view of the multifunction utility cart according to the present invention, illustrating the rearward extension of the wheelbase and body.

The operator platform 28 and its attached support 30 may be selectively elevated by the operator to provide an even higher vantage point for the operator when required, e.g., to overlook a crowd or vehicles parked in a parking lot, etc. FIG. 4 of the drawings illustrates the elevated position of the operator platform 28 and its attached support 30 in broken lines. The operator platform 28 and support 30 telescope upwardly and downwardly along the fixed vertical panel 34 located generally medially in the cart 10, with the support 30 being adjustably attached to the forward face of the panel 34. Conventional means, e.g., an electrically powered screw jack, telescoping hydraulic cylinders, etc., may be used to secure the operator support 30 to the panel 34.

The vertical panel 34 may include additional features adding to the utility and convenience of the cart 10, as desired. As the cart 10 is adapted particularly for security and emergency medical use, a flashing light (strobe, LED, etc.) 36 may be provided atop the panel 34. As the operator station 26 is open to the elements and the cart 10 provides for the carriage of injured or infirm persons in a supine position, a folding umbrella or sunshade 38 may be provided to extend as desired from the vertical panel 34, as shown generally in FIG. 7 of the drawings. (The umbrella or sunshade 38 may be enlarged from the configuration illustrated in FIG. 7, and/or may have some alternative configuration, as desired.) The emergency light 36 is preferably mounted atop the column for the umbrella 38, with the umbrella 38 selectively telescoping upwardly, extending outwardly, and retracting downwardly into the vertical panel 34 using conventional mechanisms.

Figure 7:
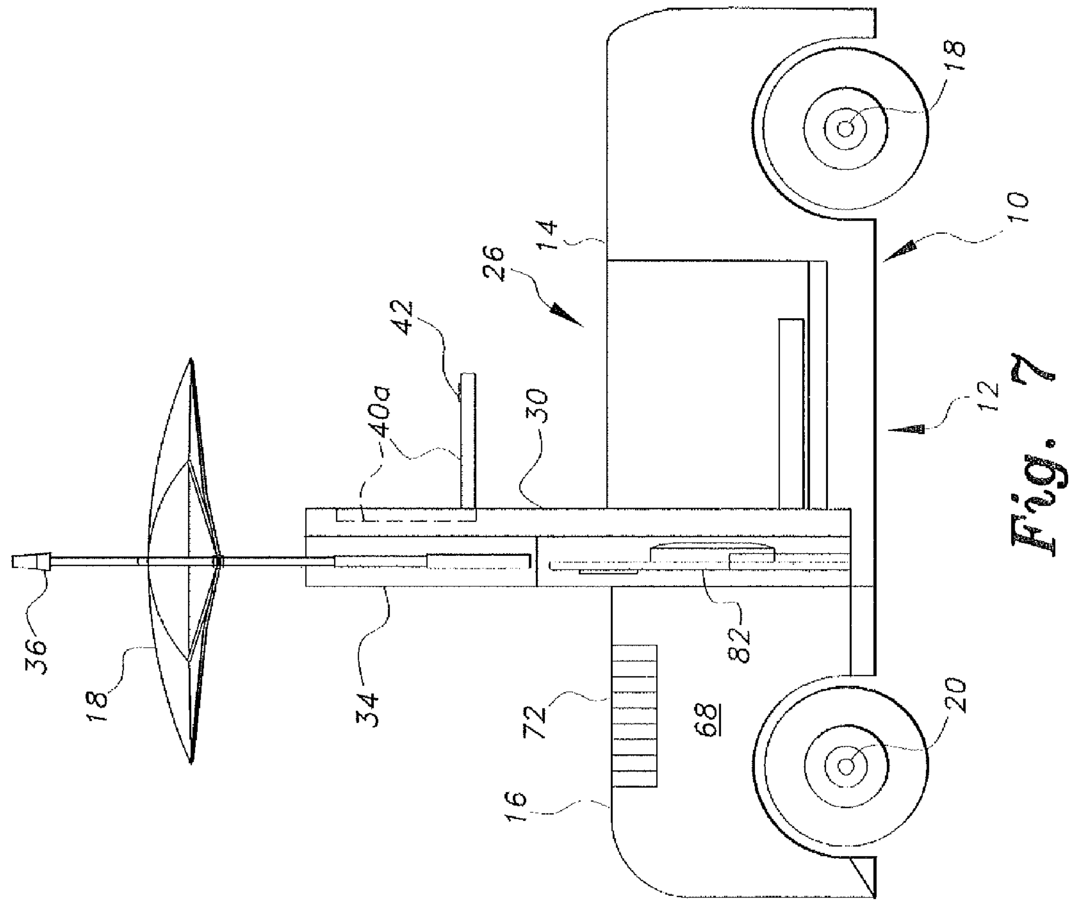
FIG. 7 is a diagrammatic right side elevation view of the multifunction utility cart according to the present invention, illustrating additional features and details thereof.

Control of the various functions of the cart 10 is accomplished by appropriate controls located in first and second or left and right operator control armrests, respectively 40 and 42. The armrests 40, 42 pivot upwardly to fold into the left and right sides of the operator support 30, generally as shown in FIGS. 6 and 7 of the drawings, with the pockets into which the armrests 40, 42 fold being shown in broken lines in those Figs. The operator may thus fold the second or right armrest 42 upwardly and into its pocket or receptacle in the operator support 30 to enter and exit the operator station 26, with the ability to fold the opposite armrest 40 allowing the operator somewhat greater freedom of movement to that side as might be necessary. The first or left operator control armrest 40 contains a series of function switches 44, e.g., rocker switches, toggle switches, etc., or some combination thereof, for the control of various functions of the cart 10, such as the extension of the body and wheelbase, the elevation of the operator platform, deployment of the stretcher and/or wheelchair platform at the back of the cart 10 (which features are discussed further below), etc. The opposite right side operator control armrest 42 includes a joystick 46 or some other means of accelerating, turning, and slowing or stopping the cart 10. The two operator control armrests 40, 42 also have receptacles therein for left and right side rear view mirrors 48 that may be selectively extended on articulating arms 50 as desired.

Figure 2:
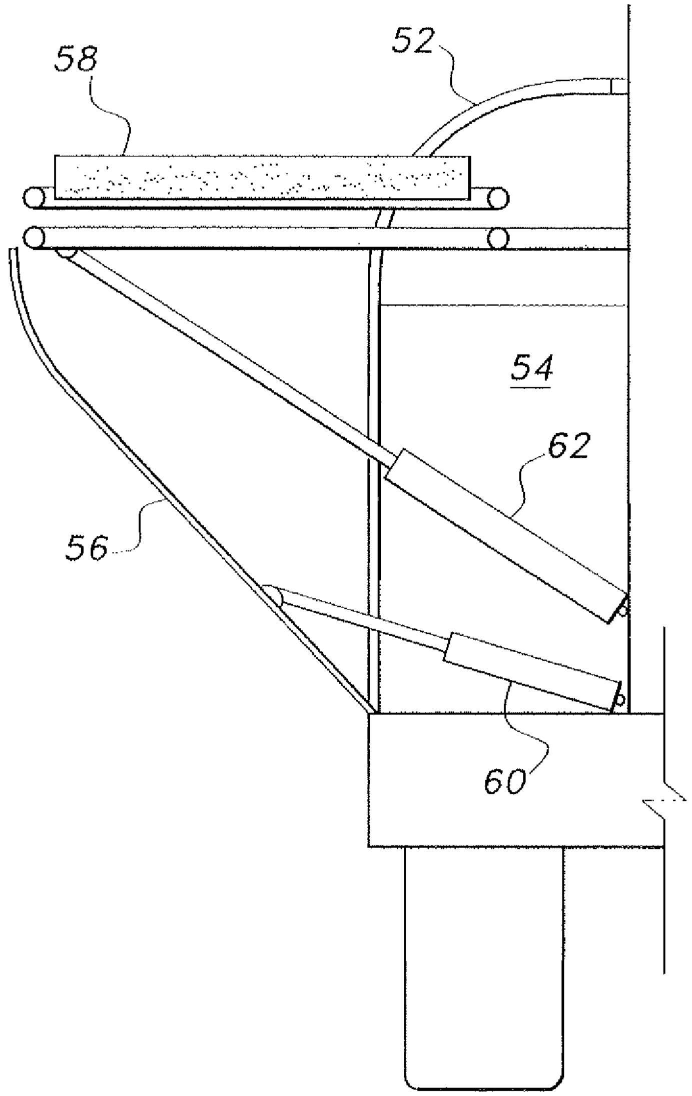
FIG. 2 is a diagrammatic partial view showing details of the operation of the stretcher compartment along the left side of the multifunction utility cart according to the present invention.
Figure 3:
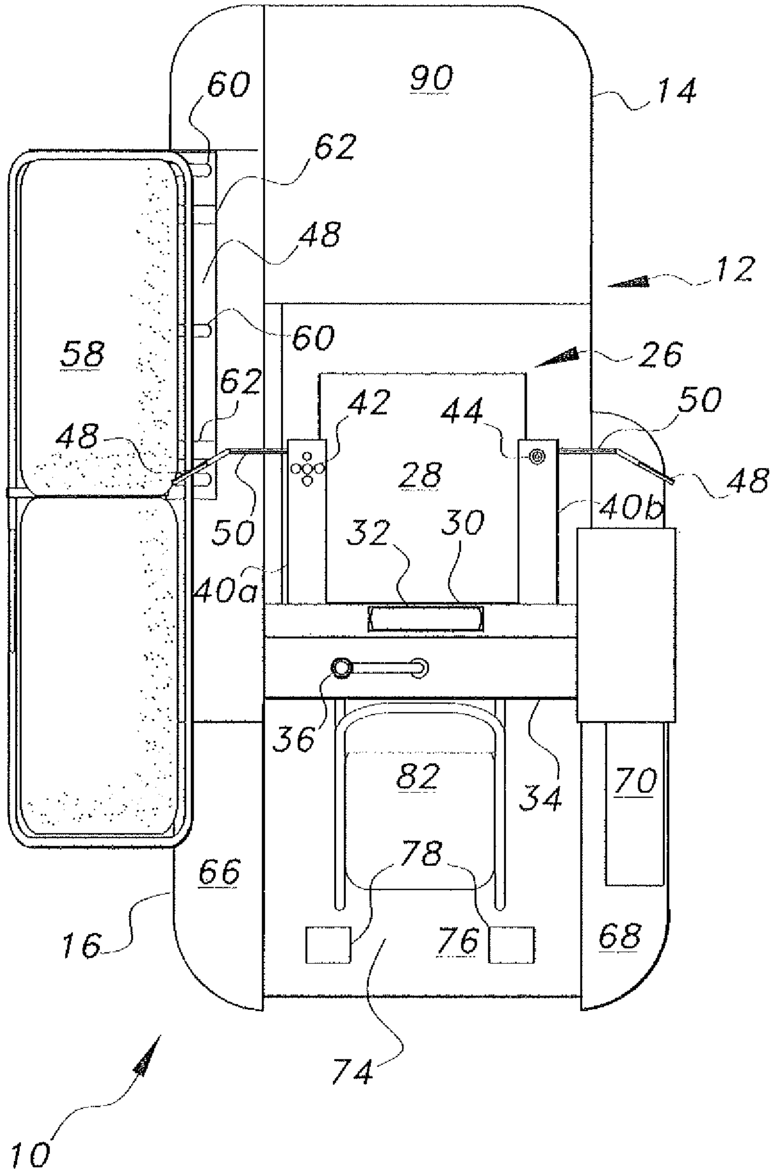
FIG. 3 is a top plan view of the multifunction utility cart according to the present invention, shown with the stretcher deployed and illustrating additional features and details.

The forward portion 14 of the body 12 opposite the open area for operator entrance and exit to and from the operator station 26 comprises a forward side panel 52. This side panel 52 defines a stretcher storage compartment or area 54 therein, as shown in FIGS. 1 through 3 of the drawings. A hinged cover 56 selectively closes over the stretcher storage compartment 54, opening to provide for the deployment of a stretcher 58 or the like stowed therein. The stretcher 58 folds at some location across its width, to allow the folded length of the stretcher 58 to be contained within the relatively short stretcher storage compartment 54. Operation of the cover 56 and deployment of the stretcher 58 are accomplished respectively by powered struts 60 and 62, e.g., hydraulic struts, electric screw jacks, etc., generally as shown in FIG. 2, which may be powered in turn by the conventional onboard power supply carried aboard the cart 10. A retractable IV support stand 64 or the like may be provided for additional medical assistance aboard the cart 10, as desired.

The rear body portion 16 of the cart 10 includes first and second or left and right rear fenders thereon, respectively 66 and 68. While the first rear fender 66 is essentially an empty enclosure to provide clearance for the stretcher 58 and its structure when the rear body portion 16 is retracted, the opposite second rear fender 68 may include a storage compartment 70 for first aid and/or other medical supplies and/or other equipment, etc., as desired. The storage compartment 70 of the second rear fender 68 is shown in its open configuration in FIGS. 1 and 3, and is closed by a sliding cover or door 72 (FIGS. 4, 5, and 7) that may be unlocked and/or opened remotely by means of the operator controls or switches 42 of the first or left operator control armrest 40.

Figure 5:
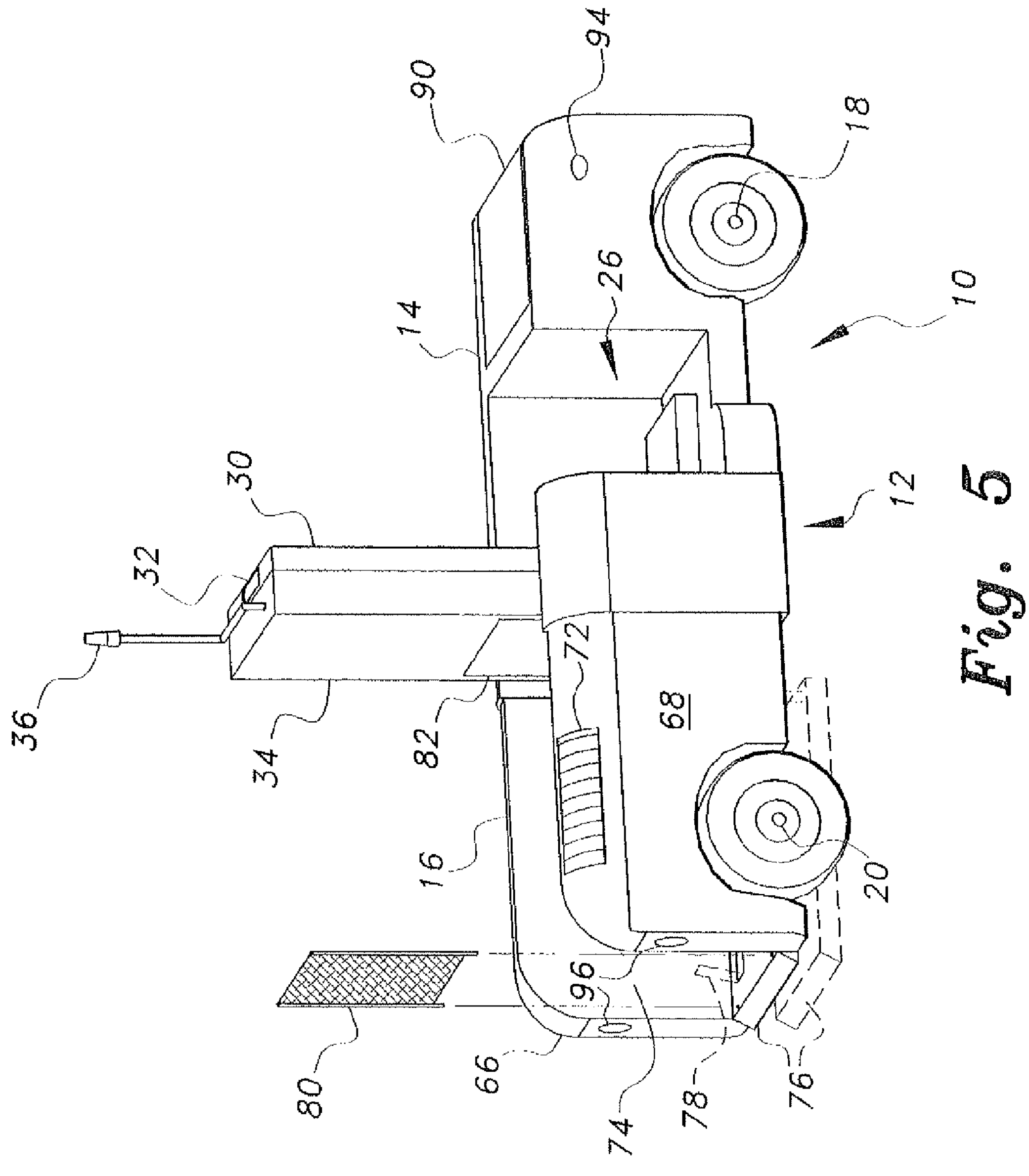
FIG. 5 is a perspective view of the multifunction utility cart according to the present invention, shown with the wheelbase and body extended and showing the drop-down floor of the rear compartment.

The two rear fenders 66 and 68 define a rearward-facing open area 74 for the carriage of persons or equipment therein. The floor of the open area 74 is defined by a vertically positionable platform 76 for wheelchair use or the like. The platform 76 may be lowered to the underlying surface between the two rear wheels of the cart 10, generally as shown in FIG. 5, to allow for the boarding or departure of a person in a wheelchair or the like. A pair of stops or chocks 78, shown retracted into the platform 76 in the top plan view of FIG. 3 with one of the stops or chocks 78 shown in its raised position in broken lines in FIG. 5, is provided to prevent a wheelchair or other article(s) carried on the platform 76 from accidentally rolling or sliding from the platform. The lowering platform 76 may serve to facilitate the loading and unloading of other heavy and/or bulky goods aboard the cart 10, as well. A removable cargo barrier 80 may be provided for additional security for the rearward open storage area 74, as required. The barrier 80 may comprise a foldable net that may be rolled or wound about one of its side posts, with the posts removably installing in corresponding holes or receptacles in the rearward portion of the lowering platform. The cargo barrier 80 may be stored in the rear fender storage compartment 74 or other suitable storage area of the cart 10, when not needed.

In many cases a wheelchair may not be available for a person needing transport on the cart 10. Accordingly, a fold-away chair 82 may be stored in the back of the fixed vertical panel 34 behind the operator support 30. The chair 82 is illustrated in its deployed position in FIGS. 3 and 6 to face rearward when deployed, and in its folded position in FIG. 6 (in broken lines) and FIG. 7 (in solid lines) within the fixed vertical panel 34. The chair 82 is concealed behind a cover 84 in the back of the fixed vertical panel 34 when not in use, as shown in FIGS. 4 and 5.

The forward portion 14 of the cart 10 also includes storage space therein, as shown in FIG. 1 and in the side elevation view in section of FIG. 6, A reasonably large forward storage compartment or trunk 86 is provided forward of the operator station 26 for the carriage of such articles as, e.g., a large fire extinguisher 88 and/or other equipment as desired. The forward trunk or storage compartment 86 is selectively closed by a hood or trunk lid 90, shown in its open position in FIG. 1 and closed in various other drawings. The large size of the hood or trunk lid 90 relative to the rest of the vehicle or cart body 12 results in the installation of headlights 92 or other suitable lighting being installed in the front of the trunk or hood lid 90, rather than in a fixed portion of the forward body 14. The front fenders may include side marker or position lights 94 therein, with the rear fenders preferably having taillights and brake lights 96 installed therein, as shown in FIGS. 4 and 5 of the drawings.

The small size and resulting light weight of the cart and its intended function for operations in a relatively small and localized area such as a large parking lot or the like, allow the cart to be electrically driven with power provided by onboard rechargeable batteries. A single electric motor may be used, or alternatively a motor may be installed in the hubs of the wheels of one or both axles, as desired. Such vehicle power systems are conventional and need not be described in detail herein. Alternatively, the cart may be powered by other means as desired. The various accessories provided on the cart may also be powered electrically, or alternatively one or more electric motors may be used to drive hydraulic or pneumatic pumps that in turn provide the motive force for hydraulic or electric motors that operate the various systems of the cart. Again, such systems are conventional and need not be described in detail herein. Accordingly, the multifunction utility cart 10 in its various embodiments and configurations provides a most versatile vehicle for security, emergency medical, and other uses.

It is to be understood that the present invention is not limited to the embodiments described above, but encompasses any and all embodiments within the scope of the following claims.

I claim:

1. A multifunction utility cart, comprising:

a body having a forward portion, a rearward portion opposite the forward portion, and opposing sides, wherein the rearward portion of the body selectively extending from and retracting into the forward portion of the body;

a forward axle disposed with the forward portion of the body;

a rearward axle disposed with the rearward portion of the body, the forward axle and the rearward axle defining a wheelbase, the wheelbase selectively lengthening and shortening in concert with the extension and retraction of the rearward portion of the body relative to the forward portion of the body;

an open operator station disposed generally medially in the body and opening only on one side of the cart;

an operator platform disposed within the operator station;

an operator support extending upward from the operator platform, the operator platform and the operator support selectively elevating from and retracting into the operator station;

a forward side panel and a cover defining a storage compartment therebetween, wherein the storage compartment is disposed along the forward portion of the body, the cover having a top edge and a bottom edge, wherein the bottom edge is hinged to the forward side panel for selective opening and closing of the cover; and a stretcher pivotally stowed in a closed position within the storage compartment, wherein the pivotal movement is about a horizontal axis, the stretcher being deployed by opening the cover thereby pivoting the stretcher outwardly from the storage compartment.

2. The multifunction utility cart according to claim 1, further comprising first and second operator control armrests retractably disposed within the operator support.

3. The multifunction utility cart according to claim 1, further comprising:

a vertical panel disposed generally medially within the body, and extending upward therefrom; and a chair foldably disposed within the vertical panel, the chair selectively deploying rearward of the panel.

4. The multifunction utility cart according to claim 1, further comprising a wheelchair platform disposed within the rear portion of the body, the wheelchair platform selectively lowering to the surface and raising within the rear portion of the body.

5. The multifunction utility cart according to claim 1, further comprising:

an equipment storage trunk disposed within the forward portion of the body; and at least one rear fender storage compartment disposed within the rearward portion of the body.

6. The multifunction utility cart according to claim 1, further comprising: laterally opposed first and second rear fenders disposed along the rearward portion of the body.

* * * * *